Nov. 4, 1969 G. R. NACCI 3,476,595

SILICA-COATED MAGNETIC TAPE

Filed July 8, 1966

INVENTOR
GEORGE R. NACCI

BY James H. Ryan

ATTORNEY 3,476,595

SILICA-COATED MAGNETIC TAPE

George Raymond Nacci, Wilmington, Del., assignor to E. I. du Pont de Nemours and Company, Wilmington, Del., a corporation of Delaware Filed July 8, 1966, Ser. No. 563,909
Int. Cl. H01b *1/02;* B44d *1/18*
U.S. Cl. 117—239 10 Claims

ABSTRACT OF THE DISCLOSURE

A coating for magnetic recording members, especially tapes, is made from a thin layer of a cured complex of silica and a preformed organic polymer containing a plurality of alcoholic hydroxyl groups, e.g., a complex of silica and a polyvinyl acetal or a hydrolyzed vinyl ester/tetrafluoroethylene copolymer.

FIELD OF THE INVENTION

Figure 1:
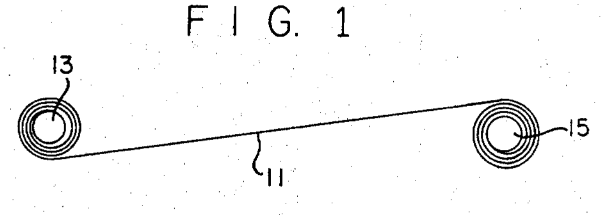

This invention relates to improved magnetic tapes and more particularly to such tapes which have on the magnetizable layer a thin coating of a silica/organic polymer composition.

DESCRIPTION OF THE INVENTION

Magnetic tapes have achieved extremely wide use in recording and retrieving information. Conventionally, such tapes have a thin layer (quarter to half mil) of finely powered crystalline magnetic particles on a flexible but substantially dimensionally stable film base, the tapes in use frequently being twisted or turned in a curve having a small radius of curvature. The magnetic particles are usually oxides of selected Group VIII metals and are attached to the film base by use of a binder. The ratio of metal oxide to binder is higher than is the proportion of pigment to binder employed in conventional coatings as noted by Spratt, "Magnetic Tape Recording," Van Nostrand, Princeton, N.J., 1964, pages 127–128. Furthermore, Haynes, "Elements of Magnetic Tape Recording," Prentice-Hall, Englewood Cliffs, N.J., 1957, page 75, states that the binder represents 10–20% of the coating mixture. The low binder—and high filler—content produces a layer that is relatively rigid.

When the magnetic layer is composed of particulate magnetic materials, generally hard metal oxides, such as iron oxide, there may be protuberances upon the exposed surface of the layer. The protuberances should be removed to obtain a product with maximum fidelity and reduced abrasive properties. Calendering, polishing, and lubricating steps have thus been incorporated in tape manufacture in attempts to improve the surface characteristics and performance of the tape. Surfaces that are not smooth or carry dust or magnetic particles may exhibit "dropout," i.e., a loss of recorded information arising from improper contact between the tape and head. Dropout is particularly serious at high tape-to-head speeds.

Even with the use of such techniques as surface polishing or calendering, the magnetic oxide layer is highly abrasive and a choice must be made whether to adjust the oxide-binder composition to give a magnetic layer which shows excellent retention of magnetic particles (i.e., good tape wear) but causes excessive wear of the recording head or to give a product which shows poor retention or magnetic particles with low recording head wear. The problem is increased in acuteness by the change from the conventional iron oxide to the newly developed and harder chromium dioxide in the magnetic layer. In general, adjustments to improve tape wear invariably result in poorer head wear.

Tapes have been made, however, which are said to show both good head wear and good tape wear. One method of accomplishing such results has been incorporation of a lubricant, e.g., graphite or a silicone, in the magnetic layer. Unfortunately, lubricants tend to be nonpermanent and disappear from the tape during use. Another approach to the problem has been overcoating the oxide layer with a clear plastic layer of about 50 microinches thick. In the latter case, it has been desirable to employ a special oxide in the magnetic layer. Furthermore, the resultant separation between recording head and the magnetic oxide causes a loss of high-frequency response that cannot be tolerated in many applications, and such tapes have not been widely used. The choice of a coating material is, moreover, restricted to some extent by the requirement that it adhere firmly to the tape particularly during all changes in curvature in normal use of the tape.

An object of this invention, therefore, is provision of a new and improved coating for a magnetic tape which can be used with conventional magnetic iron oxide and also with the newly developed ferromagnetic chromium dioxide.

Another object is provision of a new and improved magnetic tape in which the thin coating, while providing protection against tape wear, does not cause appreciable distortion or significant loss of high-frequency response.

Another object is provision of a coated tape in which the coating is adherent without cracking during passage of the tape through sharp angles or over rollers or other devices having small radii of curvature.

Figure 2:
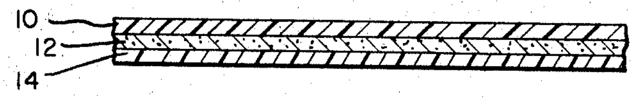
Figure 3:
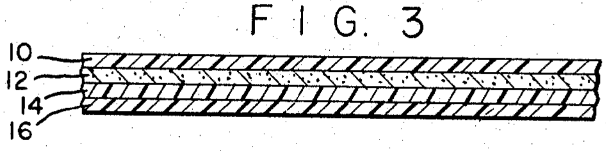

In accordance with the above-mentioned and still other objects of the invention, there is now provided a novel coated magnetic tape in which the coating is flexible and long-lived and does not significantly interfere with high-frequency response. Details will be evident from the remainder of the specification and from the drawing (not to scale) in which:

FIGURE 1 illustrates a tape 11 held on two rolls 13 and 15 and demonstrates the small radius of curvature through which a tape must turn;

FIGURE 2 is a section of a tape according to this invention coated on one side as by skim coating. Numeral 10 represents the coating, 12 the magnetic layer and 14 the flexible base or substrate; and FIGURE 3 is a section of a tape according to this invention coated on both sides as by dipping. Numerals 10 and 16 represent the coating while 12 and 14 are the magnetic layer and base as before.

The present invention provides a superior magnetic tape having coated on the magnetic layer a thin continuous wear-resistant layer of a three-dimensional, i.e., cross-linked, composition formed of 40–95% by weight of a polysilicic acid (calculated as $SiO_2$) and a remainder, i.e., 60–5%, of an organic polymer containing a plurality of alcoholic hydroxyl groups. The coating is applied from a solution of the silica- and hydroxyl-containing materials in a suitable solvent. The layer produced is quite thin, usually about 0.08–0.8 micron ($\mu$; about 3–30 microinches or 0.0003–0.003 mil). Preferably, the coating has a thickness of about 0.15–0.50 micron.

The coated tapes have been found to be smoother and with a lower coefficient of friction than the uncoated tape. They are more wear-resistant and at the same time less abrasive to the recording head. Rub-off of the metal oxide layer is also reduced, thus permitting longer intervals to elapse before cleaning the recording head. Because of the extreme thinness of the layer, such improvements are achieved with minimal reduction in high-frequency response of the magnetic tape. The coating can also be bent through a small radius of curvature many times without cracking or losing adhesion to the flexible base.

Silica compositions are generally brittle. It is therefore quite surprising that a coating composition that contains silica in such large amounts (e.g., up to 90% or more by weight), is sufficiently flexible to be used in magnetic tapes without failure due to cracking upon bending. Furthermore, from prior experience with silica-containing compositions, it would not be predicted that such thin coatings (e.g., about 0.2–0.3 micron) would give substantial wear resistance. As previously noted and as demonstrated in the description that follows, thin coatings are essential for fidelity of response. Superior results obtained from the combination of the thin layer of the silica-containing coating with the rigid layer of magnetic particles on the flexible substrate are difficult to explain. Such may be due to the peculiar combination of rigidity, hardness and incompressibility of each of the layers.

As noted, the new and improved tapes are obtained by coating a solution of polysilicic acid/organic hydroxy-containing polymer at least on the magnetic metal or metal oxide containing surface of a magnetic tape. The coating solution employed for the preparation of the smooth thin coatings by evaporation of solvent or diluent has as the solid portion 40 to 95 parts of polysilicic acid (calculated as $SiO_2$) and an organic polymer having a plurality of alcoholic hydroxyl groups in an amount needed to make a total of 100 parts by weight. The silica/organic polymers are applied from a homogeneous solution in which their total amount is from about 2–25% by weight. Solvents and/or diluents that are used should boil at a temperature of below about 125° C. and are used in amounts such that the coating solution generally has a viscosity of about 1–400 cps. The exact viscosity depends on selection of the method of coating, e.g., skim coating, doctoring, gravure roll, etc., and thickness desired.

The polysilicic acid employed with the hydroxyl-containing polymers is readily available. For example, ethyl silicate (tetraethyl orthosilicate) is a commercial product. It is soluble in organic solvents and readily hydrolyzed by water to a useful soluble polysilicic acid. By varying the amount of water, the exact degree of hydrolysis can be varied. A compatible solvent is a lower alcohol, particularly ethanol. A general formula for the preparation of the polysilicic acid solutions (15% $SiO_2$) requires 100 parts of ethyl silicate and (92–X) parts of ethanol or similar diluent where X is the amount, i.e., part, of water or preferably 0.1 N hydrochloric acid. In general, X is preferably about 22.5 or more. When X is 18 or less, the hydrolysis of ethyl silicate is insufficient to give a useful polysilicic acid for present purposes unless further hydrolysis is brought about in the coating solution or process. Although more water can be used, i.e., X=50 or more, large amounts may affect adversely the compatibility with some of the organic polymers used. The commercial condensed polysilicates such as ethyl silicate containing about 40% $SiO_2$ can be used also when hydrolyzed to an appropriate degree.

The hydroxyl-containing polymeric materials employed with the polysilicic acid in solution are those which normally are solid materials with an inherent viscosity of 0.1 or higher. A plurality of alcoholic hydroxyl groups is present in the polymer. The ratio of alcoholic hydroxyl to chain carbons of the polymer is less than 1 to 1 and may be as low as 1 to 25 or less. Generally the ratio is at least 1 to 16 and preferably more than 1 hydroxyl to 8 carbons of the chain. The polymeric materials employed are soluble in inert diluents or solvents. Evaporation of the solvent results in a three-dimensional or cross-linked complex providing an excellent coating for magnetic tapes.

Hydroxyl-containing polymers that react with silica to form the protective complex are synthetic organic polymers having a degree of polymerization of generally more than 100 such as polyvinyl alcohol, partially hydrolyzed polyvinyl esters, e.g., polyvinyl acetate, and polyvinyl acetals which contain free hydroxyl groups, e.g., polyvinyl butyral. Copolymers of vinyl esters with other monomers, such as ethylene, can also be used to give useful hydroxyl-containing polymers. Compositions of hydroxyl-containing polymers with polysilicic acid for coating solid poly(methyl methacrylate) sheeting have been described in U.S. 2,404,357; 2,404,426; and 2,440,711.

Another class of hydroxyl-containing polymers are those which have halogen present. Polymers which contain fluorine have superior properties of adhesion, thermal stability, and resistance to scratching. Polymers of this type that are particularly preferred have a ratio of at least one fluorine atom per hydroxyl group with 10% or more by weight of fluorine in the copolymer. Included are copolymers of tetrafluoro-ethylene with ω-hydroxyalkyl vinyl ethers of the formula $$CH_2{=}CHO(CH_2)_{2-10}OH$$

or with vinyl esters hydrolyzed after copolymerization.

The fluorine-containing polymers are obtained by conventional means, i.e., by copolymerization. For example, U.S. 2,468,664, describes specifically the polymerization of tetrafluoroethylene with vinyl esters to give copolymers of mol ratio of 1/2.8 and 1/4.2 which are then hydrolyzed. The reaction of such hydrolyzed copolymers with silica and use of the resultant complexes for scratch-resistant coatings on poly(methyl methacrylate) sheeting are described in the coassigned Bechtold and Brasen application Serial No. 464,064, filed June 15, 1965, and the entire specification of that application is specifically incorporated herein by reference.

Copolymers of fluorine-containing monomers with hydroxyl-containing vinyl ethers are obtained by conventional polymerization techniques. The vinyl ethers are generally obtainable by reaction of acetylene with polyhydric alcohols to provide as illustrative monomers the following: 2-hydroxyethyl vinyl ether, 4-hydroxybutyl vinyl ether, 3-hydroxypropyl vinyl ether, and 6-hydroxyhexyl vinyl ether. The fluorine-containing monomers include vinyl fluoride, chlorotrifluoroethylene, vinylidene fluoride, and tetrafluoroethylene. The preparation of such copolymers has been described in U.S. 3,159,610. The reaction of such copolymers with silicate and use of the resultant complex in scratch-resistant coatings for poly(methyl methacrylate) sheeting are described in the coassigned Bechtold and Fawcett Application Serial No. 464,063, filed June 15, 1965, the specification of which is also specifically incorporated herein by reference.

Solvents useful for the preparation of coating compositions depend on the polymeric materials employed, the substrate, and on other factors, such as evaporation rate, etc. It is usually desired that the solvent have appreciable vapor pressure at below 100° C. and preferably boil below about 100–125° C. The solvent system should be compatible with the ingredients in a wide range of proportions. Useful solvents include particularly lower alkanols (e.g., methanol, ethanol, propanols, butanols) and mixtures of alkanols with lower alkanoic acids. Halogenated solvents, e.g., trichloroethylene, can be employed. Adjuvants, such as small amounts of Cellosolve® derivatives, are useful as anti-haze agents.

The addition of small amount (0.05–5% by weight, based on the weight of polysilicic acid/polymeric alcohol) of a block copolymer of mixed lower alkylene (2–4 carbon) oxides with dimethyl siloxane promotes even spreading and drying of the coating solution. Particularly preferred block copolymer adjuvants are those having units from both polyethylene oxide and polypropylene oxide and a dimethyl silane content of 20–25% as described in French Patent 1,330,956 or or U. S. 3,172,899. The use of organosilicones in silica/polymeric alcohol coating solutions is described in the coassigned Engelhardt Application Ser. No. 464,184, filed June 15, 1965, and the entire specification of this application is incorporated herein by reference.

The solution can generally be used in coating for several weeks after prepartion, particularly if care has been taken to employ relatively pure ingredients and compatible solvents and additives. The solutions can be applied to the surfaces to be protected by known methods such as skim coating, spraying, doctoring air knife, gravure roll, dipping, etc. The solvent is removed preferably by evaporation generally at elevated temperatures to ensure its rapid and complete removal. After removal of the solvent, the coating is either heated for some time (e.g., at 60° C. for 15 hours or at 160° C. for ½ hour) or held for several days at room temperature to allow the coating to cure to the hard, abrasion-resistant layer desired. In general, the higher the silica content of the layer, the more readily the coating is cured at room temperature. Since the physical properties of the preferred polyester tape base is adversely affected by temperatures above 90° C., curing temperatures below 90° C. are preferred.

When cured, the coating of this invention has

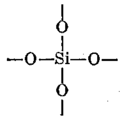

units wherein at least one oxygen is attached to another silicon and with 0 to 2 (average less than 1) other oxygens attached to the carbon of a hydroxy aliphatic polymer via condensation, and, if not all satisfied by such bonds, to hydrogen. Thus, the ultimate hard structure is thought to consist of two coextensive compatible transparent structures, one of a tough linear polymer chemcially bonded at several points to a hard, three-dimensional

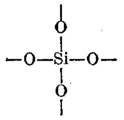

network. In other words, the structure can be pictured as a macromolecular (nonparticulate) reinforcement of the linear organic polymer or as a plasticization of a hard polyfunctional condensation polymer (polysilicic acid) with a tough linear organic polymer. It may thus be regarded as an interlocking copolymen or complex of silica and the preformed copolymer.

The following examples in which parts and percentages given are by weight further illustrate the preparation of the new coated magnetic oxide tapes.

EXAMPLE 1

A. A stock solution of polysilicic acid was prepared by mixing 100 parts of ethyl orthosilicate, 69.5 parts of anhydrous ethanol, and 22.5 parts of 0.1 N hydrochloric acid. In about four mintues the mixture reached a maximum temperature of 52° C. and was a clear, slightly viscous solultion containing the equivalent of 15% $SiO_2$. This solution was allowed to age for 24 hours before use.

A stock solution of polyvinyl propional was prepared by the following procedure: In a screw-cap bottle were placed 120 parts of denatured ethyl alcohol, 20 parts of medium viscosity, completely hydrolyzed polyvinyl alcohol, 53.5 parts of water, 0.5 part of concentrated hydrochloric acid, and 6 parts of propionaldehyde. The bottle was capped and shaken vigorously to give a smooth slurry. This mixture was allowed to stand 16 hours at room temperature and then heated to 70–80° C. in a water bath with occasional shaking until a clear, viscous solution was obtained. The amount of propionaldehyde used was sufficient to react with about 45% of the hydroxy groups present in the polyvinyl alcohol. The solids content of the solution as determined by evaporating a known amount to constant weight was 12.2%.

B. A coating solution ($SiO_2$/polymer ratio ca. 80/20) was prepared by mixing 22.2 parts of the silica stock solution with 15 parts of glacial acetic acid and 6.7 parts of the polyvinyl propional solution. Six strips of a one-inch wide commercial iron oxide computer tape ("Memorex" 62–J) were dipped in the coating solution and withdrawn at 0.86 inch/min. Two of the strips were allowed to dry at room temperature and four were baked at 65–70° C. for 18 hours.

All the coated tapes had a smooth glossy surface showing pronounced interference colors. An approximation of the thickness of the silica layer on the tape was obtained by coating the solution onto carefully cleaned, dried, and weighed microscope slides at the same withdrawal rate, baking the slides at 65–70° C. for two hours and reweighing. From the gain in weight and determination of the area coated, the coating weight was calculated to be $$1.7\text{–}1.8\times 10^{-4}\ \text{g./cm.}^2$$

Using a density of 1.9 g./cc. for the coating (calculated for an 80/20 amorphous silica/polyvinyl propional composition) the coating thickness was 0.9$\mu$. Since the edges of the coated slide were thicker than the main area, the coating thickness on the major part of the tape is believed to be less than about 0.8$\mu$.

A pressure-sensitive cellophane tape applied to the coated magnetic tape and stripped off rapidly did not remove the coating from the oxide side but did remove the silica layer from the support side. In order to demonstrate the improved abrasion resistance furnished by the thin silica composition coating, one of the oven-cured coated tapes was placed on a sheet of white bond paper, oxide side up, alongside an uncoated control tape with the tape ends aligned. A pad of No. 0000 steel wool was lightly stroked 15–20 times in one direction over the two tapes and off the end of the tapes onto the paper. The simultaneous stroking of the two tapes with the same pad equalized pressure and duration of abrasion on each tape. Oxide particles detached from the tape by the steel wool were rubbed across the paper at the end of the stroke, leaving a brown deposit. The stain at the end of the uncoated control was darker and covered a much greater area than the barely visible stain at the end of the coated tape. A quantitative comparison was obtained by measuring the optical reflection density (using a Welch 'Densichron") of the paper substrate and of the stained areas immediately adjacent to the tape and at ¼ and ¾ inch beyond the end of the tape.

| | Oxide Stain Optical Density (above background density) | | |
|---|---|---|---|
| | Adjacent to end | ¼″ | ¾″ |
| Uncoated Control Tape | 0.17 | 0.08 | 0.04 |
| Silica-Polymer Coated Tape | 0.02 | 0.01 | 0.00 |

A strip of the unbaked coated tape after standing for four days at room temperature was abraded with steel wool in essentially the same manner as above. In this case the darkened paper adjacent to the coated sample had a maximum optical density of 0.05 above the background while the paper adjacent to the uncoated control had a density of 0.15.

EXAMPLE 2

An 80/20 silica/polyvinyl propional coating solution was prepared by mixing 22.2 parts of the silica stock solution of Example 1, 15 parts of dioxane, 5 parts of water, and 6.7 parts of the polyvinyl propional stock solution of Example 1. Strips of an experimental magnetic tape comprising chromium dioxide in a polyvinylidene chloride copolymer binder on a polyester (polyethylene terephethalate) support were dipped in the coating solution and withdrawn at 1.25 inches/min., then baked at 65° C. for 17 hours. The coated tape was smooth and glossy showing interference colors that indicated a coating thickness of less than about 0.8μ. Adhesion of the silica composition coating to the oxide side of the tape as determined by a pressure-sensitive tape test was very good with only small areas of failure. These failures were actually in the oxide layer itself and not in the silica composition-magnetic oxide layer interface. The abrasion test with No. 0000 steel wool using uncoated tape as a control gave a rub-off density of 0.04 for coated tape as against 0.10 for the control.

EXAMPLE 3

A. A polymer stock solution was prepared by treating a mixture of 293 parts of a vinyl acetate-tetrafluoroethylene (3/1 mole ratio) copolymer in 2180 parts of methanol with successive small portions of sodium methoxide until a test film cast from the solution showed no carbonyl band in its infrared spectrum. The resulting solution was filtered and the solids content determined to be 8.15%.

A coating solution (silica/polymer ration 45/55) was prepared by mixing 692 parts of the above polymer stock solution with 308 parts of the silica stock solution of Example 1, 500 parts of acetic acid, and 0.32 part of a block copolymer of ethylene/propylene/dimethyl siloxane surfactant.

B. A strip of the experimental $CrO_2$ magnetic tape of Example 2 was dipped in the coating solution from A and withdrawn at 1.38 in./min., then baked 30 min. at 150° C. to cure the coating. The coated tape was glossy black with a slight convexity on the oxide side. The high cure temperature caused some warping of the polyester base. The interference colors present indicated a coating thickness of less than about 0.8μ. Anchorage of the silica compositions coating to the oxide layer was excellent as determined by the pressure-sensitive tape test. In the abrasion test using No. 0000 steel wool, the oxide stain on the paper adjacent to the end of the control tape had a reflection density of 0.13 above the background while the stain at the end of the silica-coated tape had a density only 0.02 above the background.

EXAMPLE 4

An 80/20 silica/polymer coating solution was prepared by mixing 95 parts of isoproply alcohol, 10 parts of water, 32.7 parts of acetic acid, 44.4 parts of the silica stock solution (Example 1) and 13.3 parts of the polyvinyl propional stock solution (Example 1). This solution was applied to a ½ inch wide commercial iron oxide, heavy duty computer tape ("Memorex" 022C) by passing the tape at 8–9 inches/min. around a glass and polytetrafluoroethylene guide immersed in the solution. As the tape emerged from the solution it was brought vertically upward through a four-foot section of 2-inch glass tubing which served as a drying tower. A 250-watt reflector type infrared lamp was arranged so that its beam was directed onto the tape about one foot from the top of the glass tube. After passing over a roller at the top of the tube the tape was wound up. It was later transferred to a large plastic reel on which it was allowed to stand at room temperature to cure for five days.

The coated tape was glossy and exhibited a marked play of interference colors. As a result of surface tension effects and drying from the edges, the coating was not uniform in thickness across the width of the tape but showed irregular thicker beads which extended in from the edges about ⅛ inch. An estimate of coating thickness was obtained by applying a similar coating solution containing a dye to clear polyester tape at the same tape speed. Optical density measurements indicated that the coating thickness under these conditions was about 0.5 micron.

Abrasion tests with a No. 0000 steel wool pad showed that the silica composition coated tape gave an oxide stain on the paper of 0.10 vs. 0.20 for the uncoated control. Adhesion of the coating to the oxide layer was excellent as judged by application and removal of a pressure-sensitive tape. The silica coating adhered poorly to the base side of the tape, and, to avoid difficulty in subsequent machine tests, the silica coating was stripped from the base side.

The magnetic tape as coated had a 7-track, 556-bits/inch signal on it for testing purposes. After coating nd curing, a 20 foot section of the coated tape was examined in a computer tape deck and the three center tracks found to be error free. Because of the thick bead of the silica composition at the edges, there were some dropouts in the signal in the four outer tracks. The tape was then cycled back and forth in the tape deck at 36 inches/sec. After 9750 passes the three center tracks were error free and the surface of the tape appeared unchanged. In addition, no dirt was found on the tape head. After a total of 20,000 passes the center tracks were still error free and little or no tape dust had collected on the head.

EXAMPLE 5

A polyvinyl propional stock solution was prepared essentially as described in Example 1 except that isopropyl alcohol was used instead of denatured ethyl alcohol. The solids content of the stock solution was 12.2%. Coating solution I was prepared by combining 7.0 parts of the above polymer stock solution with 46 parts of isopropyl alcohol, 5 parts of water, 16.7 parts of glacial acetic acid, and 25.3 parts of the polysilicic acid stock solution of Example I. This corresponds to a silica/polyvinyl propional ratio of 82/18. Coating solution II was prepared by diluting coating solution I with an equal weight of isopropyl alcohol.

Magnetic tape ½ inch wide was coated on the oxide surface with the above solutions by drawing the tape at 30–2 inches/min. over a pad saturated with the solution. The pad consisted of a layer of soft canton flannel covered with a fine weave nylon fabric which, in effect served as a doctor knife to meter the coating onto the tape. After the coating was applied the tape was drawn past a bank of infrared lamps which served to flash off the solvent. The tape was then festooned and allowed to cure for several days at ca. 25° C.

The tapes coated included a commercial iron oxide computer tape (described in Example 4) and an experimental chromium dioxide tape that utilized a polyvinylidene chloride copolymer-polyurethane combination as the binder. Both oxide layers were carried on a polyester base.

The coated tapes and uncoated control tapes were examined for steel wool abrasion resistance, coefficient of friction, surface roughness, tape wear resistance, tape abrasiveness, distortion, sensitivity, wavelength response, and coating thickness. Data on the tape coating conditions and test results are shown in the table herewith. Test methods are described below:

Steel wool abrasion resistance test

This test was carried out essentially as described in Example 1. Net optical density of the oxide stain is shown.

Coefficient of friction

A simple angle of repose test using a brass weight on the silica-coated surface was used to determine coefficient of friction.

Surface roughness test

The "Talysurf" was used to measure the surface roughness of these tapes. This instrument traverses a fine stylus over the tape surface and calculates a "Center Line Average" roughness figure for the surface using three cut-off wave lengths (0.1, 0.3 and 0.01 inch). The "Center Line Average" is mathematically equal to $$CLA=\frac{1}{L}\int_0^L |y|dL$$

where L is the cut-off wave length and $y$ is the displacement of the surface profile from its mean value. The CLA is expressed in microinches.

Tape wear resistance test

Tape wear resistance was evaluated on a gross wear tester that subjects the tape to 1000 head passes per minute. The device circulates a loop of ½" wide tape over 3 shims which abrade the surface away. A long wavelength signal is saturation recorded on the tape at the beginning of the test and a strip chart record is made of the playback signal as the tape is abraded. As the oxide wears down, the playback signal drops and the resulting record is used to calculate wear rates in microinches per minute.

It should be noted that this test is designed to provide a highly accelerated rate of wear on tape surfaces through the use of multiple shims and somewhat excessive tape flexing as it passes over the shims. This test may be quite harsh on overcoatings since they are under compression while they are being worn by the shims.

Wave length response test

Wave length responses were obtained by measuring the reproduce levels at various recorded wave lengths with the record level kept constant. The results were compared with similar data from a standard tape and the differences reported as relative wave length response.

Estimated coating thickness

The thickness of the overcoating was estimated by the fall-off in short wave response of each coated tape relative to the response of the uncoated control tape. The relationship between head to tape separation (assumed to be coating thicknesses), recorded wave length, and response is:

$$\text{Head-to-tape separation} = \frac{(\text{Loss of db})(\text{recording wave length})}{54}$$

TABLE

| | Tape Coated | | | | | | |
|---|---|---|---|---|---|---|---|
| | Commercial Iron Oxide Tape | | | Experimental Chromium Dioxide Tape | | | |
| | Sample No. | | | | | | |
| | Uncoated Control | 32A | 32B | Uncoated Control | 54–1 | 54–2 | 54–3 |
| Coating solution used | | I | I | | I | I | II |
| Coating speed, inches/min | | 35 | 72 | | 30 | 60 | 60 |
| Steel wool abrasion, net density | 0.15–0.18 | 0.08–0.10 | 0.08–0.10 | 0.10–0.12 | 0.06–0.08 | 0.04–0.10 | 0.08 |
| Coefficient of friction | 0.48 | 0.38 | 0.33 | | | | |
| Surface roughness, "Talysurf" CLA: | | | | | | | |
| 0.1 μ inches | 15.4 | 8.2 | 6.8 | 10.5 | 10.8 | 15.8 | 7.1 |
| 0.03 μ inches | 5.3 | 2.3 | 3.1 | 4.1 | 7.0 | 7.1 | 1.9 |
| 0.01 μ inches | 2.4 | 1.8 | 2.4 | 1.0 | 1.4 | 1.3 | 1.1 |
| Tape wear, μ inches/min | 0.9 | 0.12 | 0.06 | 2.8–3.4 | 0.5–9.6 | 0.4–0.6 | 0–0.3 |
| Tape abrasiveness, mg./18,000 ft | 0.72 | 0.05 | 0.1 | 0.15 | 0.05 | 0.04 | 0.05 |
| 7.5 mil, 3% T.H.D., db | +0 | −0.3 | +0.3 | +4.0 | +1.7 | +2.7 | +1.5 |
| 7.5 mil sensitivity, db | −1.0 | −1 | −1 | −2.0 | −3.0 | −3.5 | −3.2 |
| Wave length Response: | | | | | | | |
| 7.5 mil, db | −1.0 | −0.5 | −0.5 | +4.0 | +1.7 | +2.7 | +1.5 |
| 3.75 mil, db | −1.0 | −1.2 | −1.2 | +3.5 | +1.0 | +2.0 | +0.8 |
| 0.94 mil, db | −1.0 | −3.0 | −2.7 | +4.0 | +0.5 | +1.0 | +0.7 |
| 0.375 mil, db | −1.0 | −4.5 | −5.3 | +5.5 | +1.0 | 0.0 | +2.0 |
| 0.250 mil, db | −0.7 | −6.0 | −6.3 | +6.0 | +1.0 | −1.0 | +1.0 |
| 0.188 mil, db | −1.0 | −6.5 | −7.0 | +6.8 | +1.0 | −2.5 | +2.8 |
| 0.125 mil, db | −1.0 | −8.5 | −9.0 | +7.5 | +1.5 | −4.5 | +3.5 |
| Coating thickness (calculated): | | | | | | | |
| μ inches | | 17 | 19 | | 14 | 27 | 9 |
| microns (μ) | | 0.4 | 0.5 | | 0.35 | 0.7 | 0.2 |

Tape abrasiveness test

A shim wear tester was used to determine the abrasiveness of the tape surface. This instrument passes a 12-foot sample of ½" tape over a Phosphor bronze shim 1,525 times (producing 18,000 linear feet of tape over the shim) causing the shim to wear away at a rate proportional to the tape abrasiveness. The loss of weight of the shim is then a measure of the tape abrasiveness, and is expressed in milligrams/18,000 feet of tape.

7.5 mil 3% third harmonic distortion level test

Third harmonic distortion levels were measured by first optimizing the bias at a 0.25 mil record wave length and then varying the record level using a 7.5 mil recorded wave length until the output signal contained 3% third harmonic distortion. The reproduce signal is measured in db. This is a measure of the usable dynamic range of the tape assuming that the tape assuming that the system noise level is machine limited. A typical value for the standard tape would be 0 db. All values shown are relative to the standard tape.

7.5 mil tape sensitivity tests

Tape sensitivity is a measure of the output signal level of one tape as compared with a standard tape when the record signal levels are kept constant. A 7.5 mil recorded wave length was employed.

EXAMPLE 6

A 2-inch wide experimental chromium dioxide tape similar to that used in Example 5 was skim coated on the oxide side at ca. 11 inches/min. with coating solution I of Example 5. The solvent was flashed off by heating with infrared lamps and the tape festooned to cure for four days. The tape was then slit to ½ inch widths for evaluation tests such as described in Example 5. In comparison with the uncoated control tape, the silica composition coated tape was smoother, had more than three times the wear resistance (0.3 vs. 1.0μ inch/min.), and was less than 30% as abrasive (0.16 vs. 0.54 mg./18,000 ft.). Coating thickness as calculated from the wave length response data was 28μ inches (0.7μ).

EXAMPLE 7

A high viscosity polyvinyl propional stock solution was prepared essentially as described in Example 1 except that a high viscosity grade of polyvinyl alcohol was used instead of a medium viscosity grade. A polysilicic acid solution was prepared by treating 200 parts of ethyl orthosilicate with 88 parts of 0.1 N hydrochloric acid and this in turn combined with 120 parts of the polyvinyl propional stock solution to give a coating solution containing 17.6% solids (silica/polyvinyl propional ratio =80/20). This solution which had a viscosity of 3.8 poises was applied to an experimental chromium dioxide tape of the type described in Example 5 by means of a 120 line gravure cylinder at a coating speed of 10 feet/min. to give a coating having a thickness similar to that of the preceding Example 5. The tape was passed into a tunnel drier at 80° C. to remove solvent, then held for several days to cure at room temperature. The coated stock was slit to give ½ inch wide tape which was tested as described above. Not only was the coated tape much smoother than the control, but the tape wear rate was only 0.04$\mu$ inch/min. while tape abrasiveness was reduced to less than 40% of the control.

EXAMPLE 8

To 48 parts of a polymer stock solution containing 12.3% of a 1/1 copolymer of 4-hydroxybutyl vinyl ether and tetrafluoroethylene, 11% of n-butyl alcohol, and 76.7% of t. butyl alcohol were added 25 parts of methanol, 150 parts of denatured ethyl alcohol, 17 parts of n-butyl alcohol, 60 parts of the polysilicic acid stock solution of Example 1, and 0.025 part of silicone surfactant, as above described. By means of a saturated pad of the type described in Example 5, the solution was applied to the oxide side of an experimental chromium dioxide magnetic record card on 0.005 inch polyethylene terephthalate film. This card was heated at 85–90° C. for 20 hours to cure the silica composition coating. The coated card was smooth and glossy showing interference colors in the coated area, indicating a thickness of less than 0.5$\mu$. An abrasion test with steel wool showed that the coated area was more resistant to abrasion than the uncoated area.

The preceding examples illustrate the use of synthetic organic hydroxyl-containing polymers with polysilicic acid (silica) to give a smooth surface coating of improved properties. Other organic materials, however, are also useful providing they can be used in solution with silica. Included are such materials as cellulose esters that have a plurality of hydroxyls (e.g., as produced by partial hydrolysis).

The magnetic tape employed generally contains articles of extremely small size of hard and abrasive oxides of metals of Atomic Nos. 24–28 since these are very useful in recording information. The coating used as illustrated in the preceding description can also be applied with advantage to other magnetic materials, e.g., thin layers of magnetic elements and alloys either as evaporated continuous films or dispersions of particles in binders. Representative magnetic materials that can be used in tapes include cobalt, copper, nickel and iron alloys or compounds such as ferrites, antimonides, arsenides, sulfides or similar compositions that are known to have useful magnetic properties.

Obvious modifications and equivalents in the invention will be evident to those skilled in the pertinent art.

The embodiments of the invention in which an exclusive property or privilege is claimed are defined as follows:

1. A magnetic recording member having a flexible non-magnetic film base, a layer of magnetic material adhering to said base, and over the layer of magnetic material a coating about 0.08–0.8 micron thick formed from a cured complex of 40–95% by weight of polysilicic acid, calculated as $SiO_2$, and 60–5% by weight of a preformed organic polymer containing a plurality of alcoholic hydroxyl groups.

2. The recording member of claim 1 wherein the non-magnetic base is formed from a synthetic polyester.

3. The recording member of claim 2 wherein the synthetic polyester is polyethylene terephthalate.

4. The recording member of claim 2 wherein the magnetic material is a ferromagnetic iron oxide.

5. The recording member of claim 2 wherein the magnetic material is ferromagnetic chromium dioxide.

6. The recording member of claim 1 wherein the preformed organic polymer is a synthetic hydroxyl-containing polymer having a degree of polymerization greater than 100.

7. The recording member of claim 1 wherein the preformed organic polymer is a synthetic hydroxyl-containing polymer containing also at least 10% by weight of fluorine in the copolymer, the ratio of fluorine to hydroxyl being at least 1:1.

8. The recording member of claim 1 comprising a synthetic polyester base, a magnetic layer of ferromagnetic chromium dioxide on the base and a coating on the magnetic layer wherein the preformed organic polymer is a polyvinyl acetal.

9. The recording member of claim 1 comprising a synthetic polyester base, a magnetic layer of ferromagnetic chromium dioxide on the base and a coating on the magnetic layer wherein the preformed organic polymer is a hydrolyzed vinyl ester/tetrafluoroethylene copolymer.

10. The recording member of claim 1 comprising a synthetic polyester base, a magnetic layer of ferromagnetic chromium dioxide on the base and a coating on the magnetic layer wherein the preformed organic polymer is a 4-hydroxylbutyl vinyl ether/tetrafluoroethylene copolymer.

References Cited

UNITED STATES PATENTS

| | | | |
|---|---|---|---|
| 2,404,426 | 7/1946 | Bechtold et al. | 117—138.8 |
| 2,404,357 | 7/1946 | Bechtold | 117—138.8 |
| 2,440,711 | 5/1948 | Bechtold | 117—72 |
| 2,956,955 | 10/1960 | Arthur. | |
| 3,055,770 | 9/1962 | Sankuer et al. | 117—72 X |
| 3,109,749 | 11/1963 | DiRicco | 117—76 X |
| 3,159,610 | 12/1964 | Slocombe et al. | 260—87.5 |
| 3,172,899 | 3/1965 | Bailey | 252—358 X |

WILLIAM D. MARTIN, Primary Examiner

B. PIANALTO, Assistant Examiner

U.S. Cl. X.R.

117—68, 138.8, 161, 235, 237